United States Patent [19]

Esposito

[11] 4,193,078

[45] Mar. 11, 1980

[54] ELECTRICAL CONTACT FOR CONDUCTIVE-BACKED PAPER

[75] Inventor: Ralph H. Esposito, Denver, Colo.
[73] Assignee: Honeywell Inc., Minneapolis, Minn.
[21] Appl. No.: 888,921
[22] Filed: Mar. 22, 1978
[51] Int. Cl.$^2$ .................. G01D 15/10; H05B 1/00
[52] U.S. Cl. .................................. 346/76 R; 219/216
[58] Field of Search .................. 346/76 PH, 76 R; 219/216

[56] References Cited

U.S. PATENT DOCUMENTS

| | | | |
|---|---|---|---|
| 3,319,251 | 5/1967 | Reis | 346/1 |
| 3,887,787 | 6/1975 | Gregg | 219/216 |
| 4,023,184 | 5/1977 | Stillman, Jr. | 346/76 PH |

*Primary Examiner*—George H. Miller, Jr.

*Attorney, Agent, or Firm*—Laurence J. Marhoefer; Lockwood D. Burton

[57] ABSTRACT

A particulate, resilient, electrically conductive member having a low thermal mass which extends across the width of a conductive backed recording paper and conducts electrical energy to the conductive backing to heat the paper and develop an image.

In a preferred embodiment, a comb-like contact has a plurality of closely spaced resilient fingers which extend across the width of the web and make contact with the conductive backing.

Due to the low thermal mass of the contacting fingers, and the poor thermal path to conduct heat away from the fingers, they rapidly reach the temperature of the paper.

4 Claims, 3 Drawing Figures

ELECTRICAL CONTACT FOR CONDUCTIVE-BACKED PAPER

BACKGROUND OF THE INVENTION

1. Field of the Invention

This invention relates to a recorder with an improved apparatus for making electrical contact to a conductive backed web material upon which information is recorded and more particularly to a contact for use with dry-silver, carbon-backed recording paper.

2. Description of the Prior Art

One way to heat a moving web is to provide a conductive backing for the web and pass an electrical current through the backing. Although conductive, the backing has a certain resistance and the amount of heat generated is a function of the quantity of current and the resistance of the backing. In the prior art, a pair of spaced electrical bars or rollers is used to provide an electrical contact between the conductive backing of the web and a source of electrical energy.

While such prior art contacts are satisfactory for some applications, they are not satisfactory for recorders employing dry-silver or other similar conductive backed recording paper.

SUMMARY OF THE INVENTION

An object of this invention is the provision of an improved apparatus for making electrical contact with conductive-backed webs such as dry-silver, carbon-backed recording paper.

Briefly, this invention contemplates the provision of a particulate, resilient, electrically conductive member having a low thermal mass which extends across the width of a moving conductive backed recording web. The member conducts electrical energy to conductive backing to generate heat in the web but does not itself remove appreciable heat because of its low thermal mass. Applicant has discovered that uneven heating in the prior art recorders is due to the fact that, as the paper is heated, it expands and distorts making poor electrical contact. In addition, application has discovered that, as the conductive-backed paper comes in contact with a bar or roller, some of the heat necessary for developing an image is lost through conduction into the roller. In a preferred embodiment of the invention, a plurality of light weight resilient fingers provide the electrical contact with the conductive backing of the paper.

DESCRIPTION OF THE PREFERRED EMBODIMENT

Detailed Description

Figure 1:
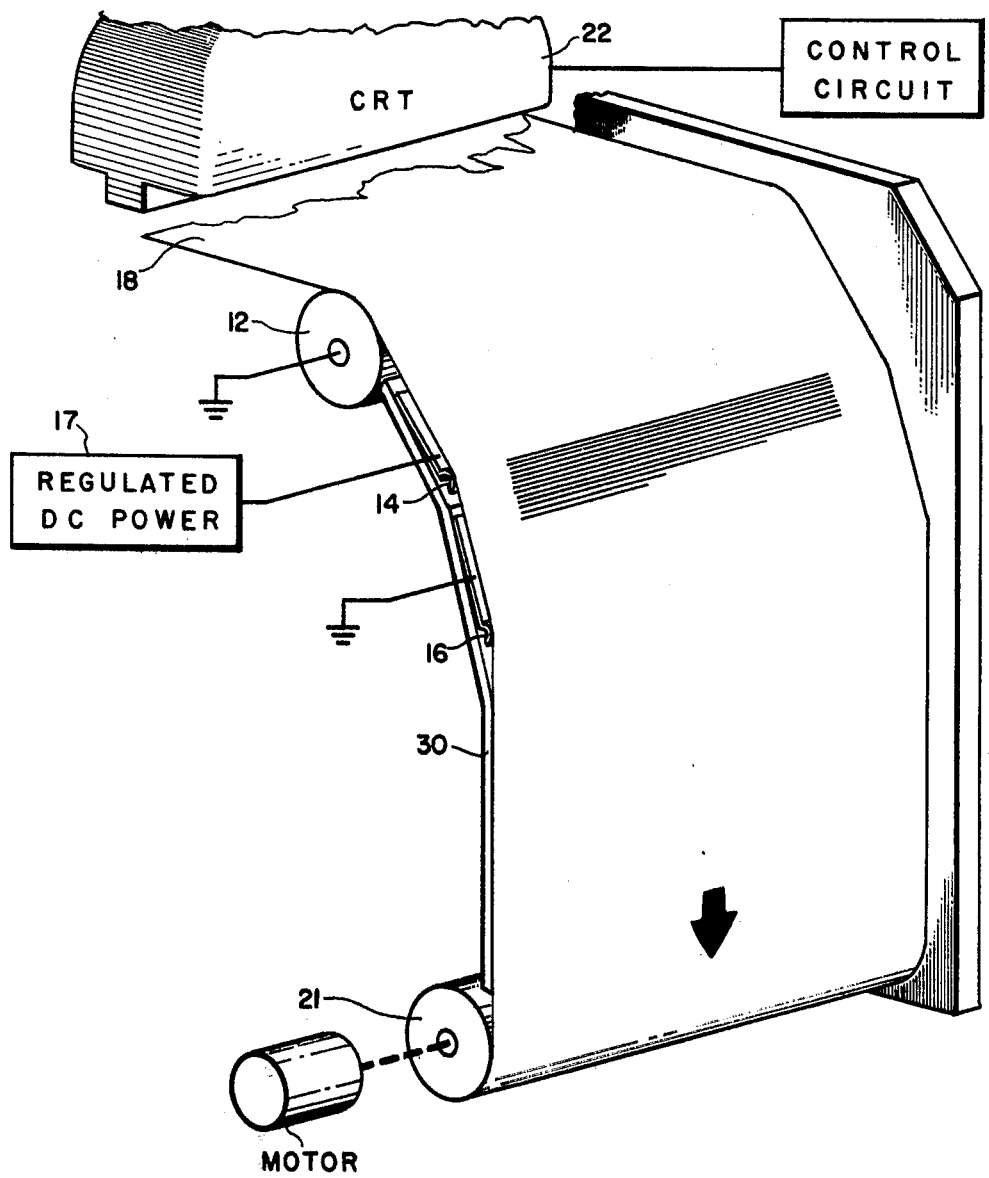
FIG. 1 is a fragmentary perspective view of a recorder, showing the path of the paper on which an image is to be recorded and a contact for making contact with the paper in accordance with this invention.

Referring now to the drawings, FIG. 1 shows an upper roller contact 12, and an intermediate resilient finger contact 14 and a lower resilient finger contact 16.

In practice, the intermediate contact 14 is energized with a suitable DC voltage from a source 17, and the two outer contacts 12 and 16 are common.

The carbon-backed, dry-silver paper web 18 is driven in the direction of the arrow in FIG. 1 by a drive roller 21. In a typical recorder of this invention the beam of cathoderay tube (indicated schematically at 22) records information on the web 18 by impinging on dry-silver coating on the paper 18. An image is developed by heat generated in the region between the contacts 12 and 16 by a current flowing in a conductive-backing on the paper. It should be noted that since the web is cool when it reaches the first contact 12, this initial contact can be in the form of a roller or bar.

In accordance with the teachings of this invention, the intermediate contact 14 and preferably the lower contact 16 should be of the resilient finger variety. These contacts extend all the way across the paper and are shown in detail in FIG. 2.

Figure 2:
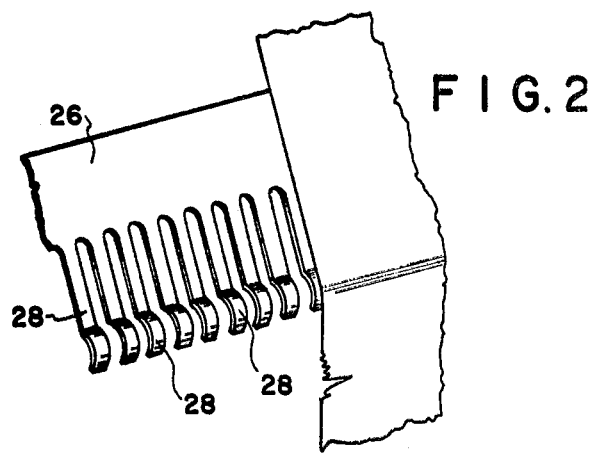
FIG. 2 is a detail perspective view of a preferred embodiment of the improved contact which is the subject matter of this invention.

Referring now to FIG. 2 as well as FIG. 1, the contact 14 or 16 (which are preferably identical) consists of a sheet of conductive stock 26 with a series of closely spaced fingers 28.

Figure 3:
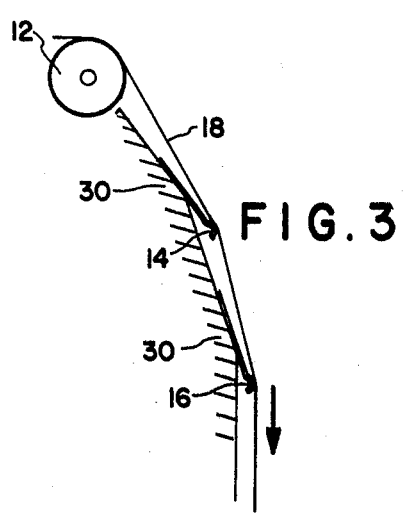
FIG. 3 is a schematic drawing showing an arrangement of the contacts relative to the paper.

In one practical embodiment, the fingers 28 are 0.00984 inches thick and made of beryllium copper; the fingers 28 are approximately one inch long and spaced 0.280551 inches from one another. They are 0.3125 inches wide and the height of the radius is 0.187 inches. The contacts 14 and 16 are fixed to a frame or base 30 and are so disposed relative to the path of the web that they are slightly depressed by the paper. This arrangement, shown schematically as FIG. 3, permits the fingers to remain in contact with the conductive backing of the paper even if it buckles or otherwise distorts.

The low thermal mass of fingers causes them to reach rapidly the temperature of the paper. This is extremely important to the successful operation of the recorder.

In an alternative embodiment of the invention, a conductive fibrous material may be selected for the resilient fingers. One satisfactory material is an electrical strip of conductive velcro. Velcro is a trademark of Velcro Corporation, Fifth Avenue, New York, New York.

The embodiments of the invention in which an exclusive property or privilege is claimed are defined as follows:

1. A recorder for recording information on a web of conductive-backed material in which a latent recorded image developed by heat generated by electricity passing through the conductive backing, comprising in combination:

means for driving the conductive-backed web of recording material along a predetermined path;

a first electrical contact extending across the width of said web and positioned to contact said web as it moves there across;

a second electrical contact positioned downstream of said first contact in the direction of movement of said web and extending across the width of said web and positioned to contact said web as it moves there across;

second contact comprising a particulate, resilient, electrical conductive member having a low thermal mass having a uniformly low electrical conductivity; and means for energizing said first and second contacts as said web moves across them.

2. A recorder for recording information on a web of conductive-backed material in which a latent recorded image is developed by heat generated by electricity passing through the conductive backing as in claim 1 further including a third electrical contact positioned downstream of said first and said second electrical contacts in the direction of movement of said web and extending across the width of said web and positioned to contact said web as it moves there across;

said third electrical contact comprising a particulate, resilient, electrically conductive member having a low thermal mass having a uniformly low electrical conductivity; and means for energizing said third electrical contact as said web moves there across.

3. A recorder for recording information on a web of conductive-backed material in which a latent recorded image is developed by heat generated by electricity passing through the conductive backing, comprising in combination:

means for driving the conductive-backed web recording material along a predetermined path;

a first electrical contact extending across the width of said web and positioned to contact said web as it moves there across;

a second electrical contact positioned downstream of said first electrical contact in the direction of movement of said web and extending across the width of said web and positioned to contact said web as it moves there across;

said second contact comprising a series of small, resilient fingers connected to a common base, each of said fingers having a low thermal mass; and means for energizing said first and said second contacts as web moves across them.

4. A recorder for recording information on a web of conductive-backed material in which a latent recorded image is developed by heat generated by electricity passing through the conductive-backing as in claim 2 further including a third electrical contact positioned downstream of said first and said second contacts in the direction of movement of said web and extending across the width of said web and positioned to contact said web as it moves there across;

said third contact comprising a series of closely spaced, resilient fingers connected to a common base, said fingers and said base being electrically conductive and said fingers having a low thermal mass having a uniformly low electrical conductivity; and means for energizing said third contact as said web moves there across.

* * * * *